United States Patent Office 2,733,850
Patented Feb. 7, 1956

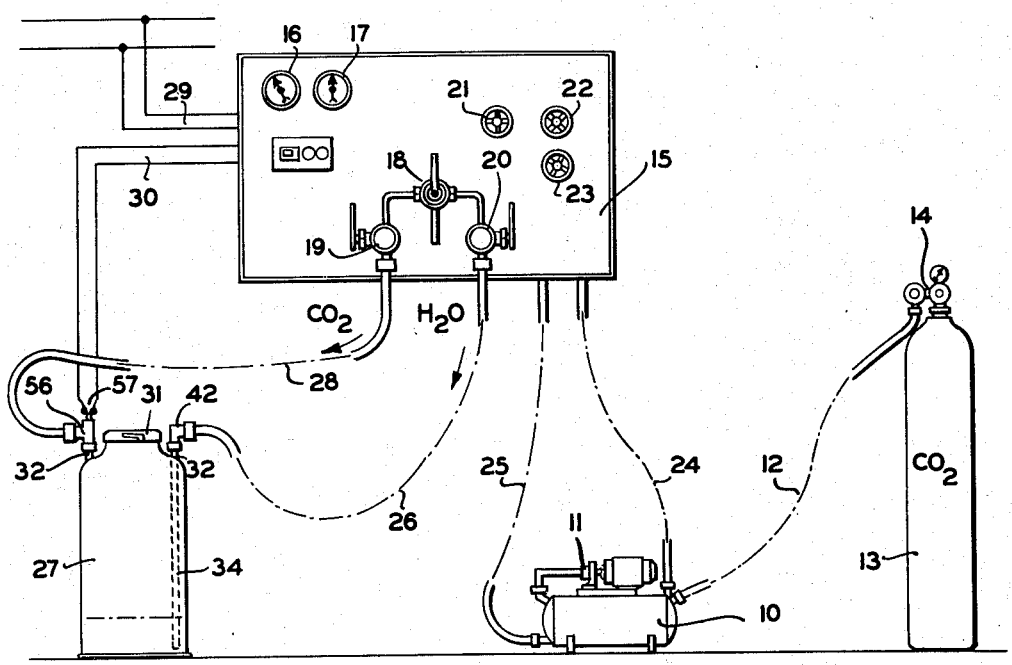

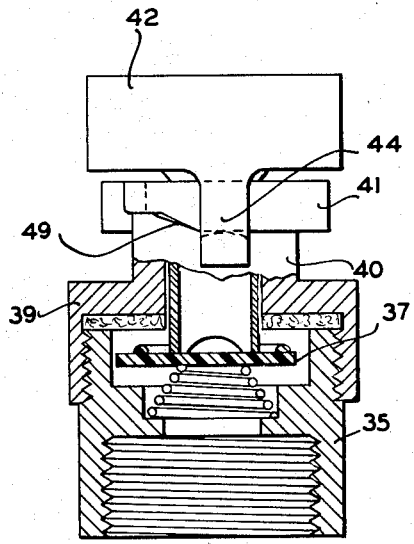
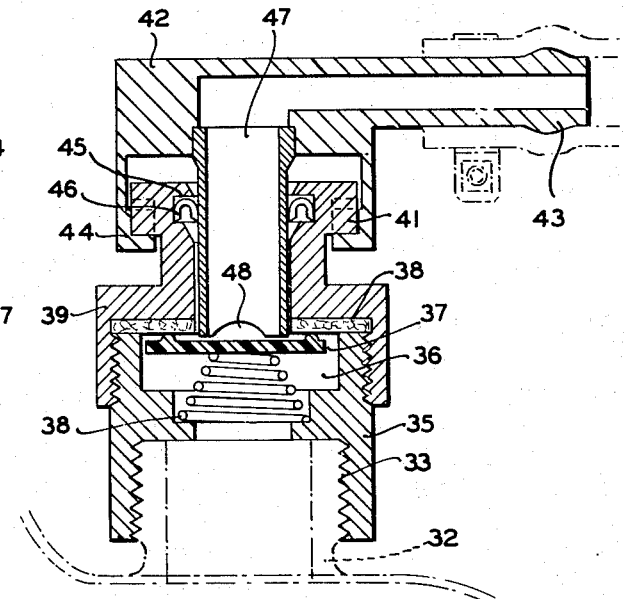
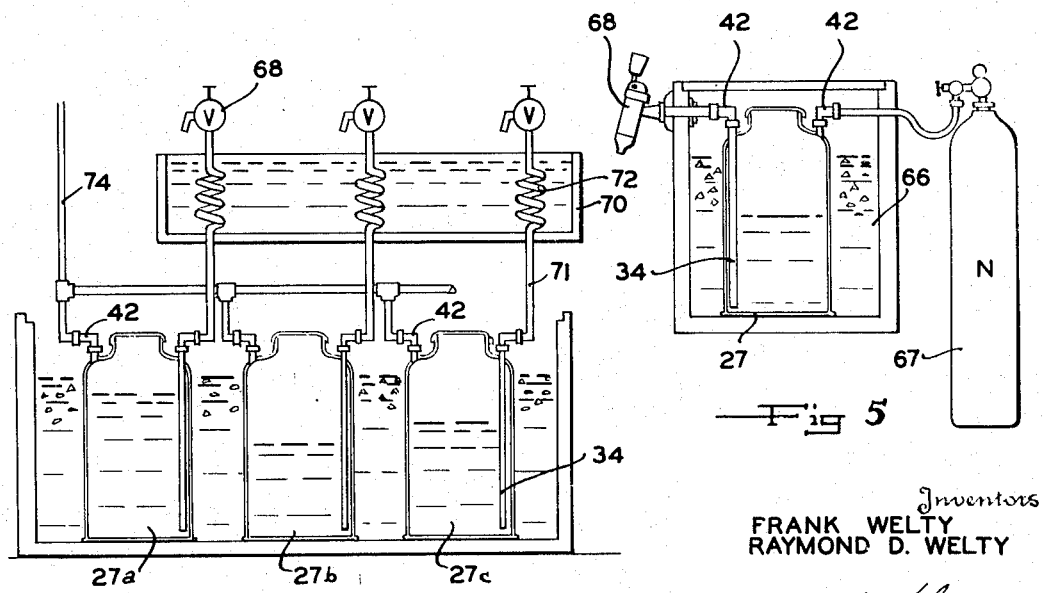

2,733,850
METHOD AND APPARATUS FOR DISTRIBUTING AND DISPENSING CARBONATED BEVERAGES

Frank Welty and Raymond D. Welty, Youngstown, Ohio, assignors to Carbonic Dispenser, Inc., Canfield, Ohio, a corporation of Ohio Original application January 26, 1950, Serial No. 140,598. Divided and this application April 17, 1952, Serial No. 282,751

14 Claims. (Cl. 226—115)

The present application is a division of our co-pending application Ser. No. 140,598, filed January 26, 1950.

This invention relates to the art of distributing and dispensing carbonated beverages and more particularly to improved methods and equipment for preparing the beverage in the first instance, charging or positioning the same in closed shipping containers, and dispensing the same from such containers at the point of consumption. The invention as a whole therefore seeks to provide an improved general arrangement for the commercial handling of carbonated beverages and it has as its principal object the simplification of and the reduction in the cost of preparing, distributing and dispensing these beverages.

More specifically, one of the objects of the present invention is to provide an improved and simplified method for preparing and charging the carbonated beverage into a shipping container wherein the mixing of the flavoring and sweetening syrup with the carbonated water which is usual in beverage manufacture is accomplished directly in the shipping container and simultaneously with the filling of the container with the carbonated water whereby the handling of the ingredients is kept to a minimum and is effected under the best possible sanitary conditions while the apparatus required is simple, inexpensive and readily maintained for substantially continuous use.

A further object of the invention is the provision of substantially simplified and improved apparatus for charging a closed shipping container for carbonated beverages with carbonated water or with a carbonated beverage and wherein the charged water or beverage is maintained at a predetermined high degree of carbonation both during and after completion of the charging operation.

This object is accomplished, in accordance with the invention, by providing in the charging equipment an improved arrangement for supplying carbonated water or beverage to the shipping container and for maintaining a predetermined back pressure of a suitable inert gas in the container during the filling thereof and also by providing an improved shipping container and improved connections thereto for the liquid-supply conduit and the gas purge conduit whereby full carbonation is maintained during the filling operation and upon completion thereof the conduits may be quickly disconnected without any appreciable loss of carbonation in the liquid stored in the container.

Another more specific object of the invention is the provision of improved apparatus for discharging the carbonated beverage from the shipping container at the point of use whereby the beverage is always maintained in a fresh and palatable condition, and is dispensed into the customer's glass with a desired high degree of carbonation.

A still further object of the invention is the provision, in an installation for dispensing a number of different carbonated beverages from the respective containers therefor, of an improved method for controlling and maintaining the proper desired degree of carbonation of the beverage in each of the respective containers regardless of differences in the temperatures and in the quantities of liquid remaining in the respective containers.

The above and other objects and advantages of the invention will become apparent upon consideration of the following detailed specification and the accompanying drawing wherein there is disclosed a certain preferred embodiment of the invention.

In the drawing:

Figure 1 is a front elevation of a beverage container charging assembly constructed in accordance with the principles of the invention;

Figure 2 is a schematic showing of the essential parts of the apparatus of Figure 1;

Figure 3 is a vertical section through a valved conduit connector utilized on the beverage shipping container shown in Figures 1 and 2;

Figure 4 is another view of the assembly of Figure 3 but showing the valve thereof in open position;

Figure 5 is a sectional view of a beverage dispensing installation utilizing one of the shipping containers of the assembly of our invention; and Figure 6 is a sectional view of a dispensing installation of our invention utilizing a plurality of shipping containers for dispensing different flavored drinks.

Referring first to Figures 1 and 2, the reference numeral 10 designates a carbonator which may be utilized as the high pressure source of carbonated water for our improved container charging assembly and the device 10 may be of the kind shown and described in detail in our co-pending application Ser. No. 11,008, filed February 26, 1948 for "Automatic Liquid Carbonator," now U. S. Patent No. 2,588,677, issued March 11, 1952. Fresh water is supplied to the carbonator by means of the motor driven pump 11 and carbon dioxide gas under controlled pressure is supplied thereto by the conduit 12 which is connected to the supply bottle 13 through a pressure regulator 14. We also provide a control panel 15 on the face of which are mounted pressure gauges 16 and 17 and the control handles for valves 18, 19, 20, 21, 22 and 23. Leading to the control panel is a conduit 24 for supplying carbon dioxide gas under pressure and as shown this conduit is connected with the conduit 12. Conduit 25 is connected with the outlet of the carbonator 10 for supplying carbonated water under pressure. A flexible conduit 26 supplies carbonated water from the control panel 15 to the container 27 being filled and a second flexible conduit 28 is provided to maintain gaseous back pressure on a container 27 through the piping circuit to be hereinafter more fully described. Also leading into the control panel 15 is a source of electric current 29 and a control circuit 30, the functions of which are also described below.

The container 27 which is preferably constructed of stainless steel has a fluid-tight closure cap 31 of appreciable diameter to facilitate charging of the flavoring syrup and cleaning and inspection of the interior of the container. As shown, the container is provided with a shoulder at its upper end outwardly of the cap 31 and extending upwardly of this shoulder is a pair of circumferentially spaced coupling bosses 32 (see Figure 3) which are exteriorly threaded as at 33. In each container a dip tube 34 extends downwardly from one of the bosses 32 to within a short distance of the bottom of the container.

Screw-threadedly received on each of the bosses 32 is a fitting 35 having a centrally disposed recess 36 in which is housed a disc-type of valve 37 urged upwardly by a coil spring 38. Valve 37 is arranged to seat against a washer 38 which is clamped to the top end surface of the fitting 35 by a fitting 39 which is screw-threaded onto the upper end portion of the fitting 35 as shown. Fitting 39 is provided with a neck 40 having an upper bayonet type of flange 41 for quick connection and disconnection with respect to a coupling member 42 which has an integral bulbed stem 43 for receiving a flexible conduit as either of the lines 26 or 28, for example. Coupling member 42 has a pair of downwardly and inwardly turned hook-like portions 44 which are receivable under the flange 41 to lock the coupling member 42 to the fitting 39 upon rotation with respect to the fitting 39 in accordance with usual practice. The bore through the fitting 39 is formed with an annular recess 45 to receive a sealing ring 46. Carried with and extending downwardly from the fitting 42 is a tube 47 having a scalloped lower edge 48 and by referring to Figure 3 it will be noted that the outer surface of the tube 47 has wiping contact with the ring 46 upon the part 42 being assembled on the fitting 39. In accordance with conventional practice the flange 41 has a pair of diametrically opposed cam surfaces 49 so that upon rotating the part 42 on the fitting 39 to lock these members together the part 42 and the tube 47 move downwardly whereby the lower end of the tube 47 engages the valve 37 to move the latter to open position as shown in Figure 4.

Referring again to Figures 1 and 2 there is provided a differential relief valve 50 having a spring biased diaphragm 51 connected to an exhaust valve 52 and the space on one side of the diaphragm is connected to the gas supply conduit 12 through conduits 24 and 53, the latter being in communication with the pressure gauge 17. The space on the valve side of the diaphragm 51 is connected by means of a conduit 54, a solenoid operated valve 55, and manual valve 19 with the flexible conduit 28 to the outer free end of which is attached a detachable coupling 56 which is generally similar to the coupling 42 above described except that a pair of insulated electrodes 57 are inserted vertically in the top wall of the coupling member. It should be noted that the current supply circuit 29 is the energizing circuit for the valve 55, that the control circuit 30 is connected with the electrodes and through a suitable conventional relay assembly, not shown and not a part of the present invention, operates to connect the supply circuit 29 with the solenoid of the valve 55 upon the two electrode tips 57 being contacted by liquid in the fitting 56. Valve 55 is normally open, however, and is closed by energization of the solenoid only when liquid rises in the fitting 56 to contact the exposed points of the electrodes 57.

The spring-bias acting on the diaphragm 51 is such that the valve 52 will be maintained closed so long as the pressure in conduit 54 is less than the pressure in conduit 53 by a predetermined amount as for example fifteen pounds per square inch. By referring to Figure 2 it will be noted that the pressure gauge 16 is in communication with the conduit 28 so that a comparison of the readings of the gauges 16 and 17 will monitor the operation of the valve 50 as will become more apparent hereinafter.

The carbonated water supplying circuit for the filling conduit 26 comprises the carbonator 10, the conduit 25 and the valves 22 and 20 in series. For a purpose to be later described the fittings on the panel 15 to which the flexible conduits 26 and 28 are connected are interconnected by a jumper conduit 58 in which is positioned the three-way valve 18 having an exhaust port 59. Normally, however, the valve 18 is in closed position as shown in Figure 2. Interconnecting the valves 19, 55 and the valves 20, 22 is a jumper conduit 60 in which is positioned the manual valve 21.

For the purpose of insuring the proper functioning of the differential valve 50 at the start of a container filling operation we provide a second differential valve 61 having a spring-biased diaphragm 62, the enclosed side of which is connected to the conduit 60 between the valves 21 and 55 by means of a conduit 63. The space on the opposite side of the diaphragm 62 is connected to the gas supply line 24 through the manual valve 23 and a conduit 64. The outlet of the valve of the assembly 61 is connected to the flexible conduit 26 by means of a conduit 65.

In the operation of the apparatus thus far described a predetermined quantity of the desired flavoring syrup is first placed in the shipping container 27 and the cap 31 immediately applied and locked whereupon the coupling member 42 which is on the flexible conduit 26 is applied to that fitting 39 of the container which is associated with the dip tube 34. The fitting 56 which is on the flexible conduit 28 is applied to the other fitting 39 on the container. At this time valves 18 through 23 are closed while solenoid valve 55 is open and of course the valve 52 is closed due to the pressure exerted on the opposite side of the diaphragm 51 by the gas in conduit 53. As soon as possible it is desirable to purge all the air from the space in container 27 above the syrup and to replace the same with the inert carbon dioxide gas so as to arrest oxidation of the syrup. It is also necessary and desirable to maintain a back pressure of the carbonating carbon dioxide gas in the container 27 during the filling of the same with the carbonated water and all of this is accomplished by first opening both valves 19 and 20 and then opening valve 23. The latter admits full gas pressure through conduits 64, 65 and 26 into the dip tube 34 and the carbon dioxide gas being heavier than air will immediately blanket the surface of the syrup and upon rising will force the air in the container 27 upwardly and out through the coupling 56, flexible conduit 28, valve 19, valve 55, and into conduits 54 and 60. As this air pressure builds up to within fifteen pounds, for example, of the gas pressure supplied in the conduits 24 and 53 the valve 52 will be open and the air will bleed out of the exhaust port provided. The escaping air provides an audible signal and after a sufficient interval of time to enable most of the air to be purged (a matter of four or five seconds in most installations) the valve 23 is shut off and immediately the back pressure in conduit 63 closes the valve 61. Valve 22 is now opened and carbonated water under the pressure of the gas in conduits 12 and 24 is forced through conduit 25, valves 22 and 20, flexible conduit 26 and dip tube 34 into the bottom portion of the mass of syrup contained in the bottom of the container 27. As the carbonated water bubbles up through the syrup it takes portions of the syrup with it so that there is thus effected a thorough intermixing of the syrup and carbonated water and this mixture is quite stable due primarily to the corbonation of the water furnished. It should be noted particularly that during this filling operation a back pressure $CO_2$ gas, of a value of thirty-five pounds per square inch for example, is maintained on the mixture so that there is no loss of carbonation of the water or the mixture. As the liquid level rises in the container 27 the back pressuring gas continues to be expelled at the required rate through the valve 52 but as explained above the valve assembly 50 requires a back pressure to within fifteen pounds, for example, of the head pressure exerted and in the present illustration the gas pressure maintained in the conduits 12, 24 and 53 may be taken as fifty pounds per square inch. Upon the container 27 becoming filled the liquid rises in the fitting 56 to contact the lower points of the electrodes 57 and immediately the valve 55 is energized and closed whereupon the back pressure in the flexible conduit 28 immediately rises to arrest the inward flow of water. By noting the cessation of escaping gas or the increase in pressure at the gauge 16 to equal the pressure at the gauge 17 the operator knows that the container is filled and he may immediately close both the valves 19 and 20, after which the couplings 42 and 56 are given a short turn to disconnect the same from the fittings 39. It should be observed particularly that the valves 37 in the fittings 35 close immediately upon withdrawal of the couplings 42 and 56 and are held closed both by the action of the springs 38 and by the internal pressure developed in the container 27 by the carbonated water or mixture.

Valves 18 and 21 are provided to facilitate flushing out of the conduit system as is required from time to time during normal operation of the apparatus.

It is contemplated by this invention that the pre-mixed and carbonated beverage will be shipped to the point of consumption directly in the container 27 and in Figure 5 there is illustrated a dispensing arrangement utilizing the pre-filled and charged container 27. Thus, the dispensing facility may include a cooling chamber 66 for receiving the container 27 and a bottled source 67 of an inert gas, preferably nitrogen, as well as a dispensing faucet 68 which may be of the kind disclosed and claimed in our U. S. Patent No. 2,331,527, issued October 12, 1943. We have found that the use of nitrogen gas as the expelling agent for the pre-mixed carbonated beverages at the dispensing point possesses outstanding and unusual advantages in maintaining the quality of the beverages over long periods of time and in maintaining the desired and initially imparted degree of carbonation of the beverages over long periods of time and regardless of the quantities of liquid remaining in the containers 27 and of the temperature or temperatures thereof. The first requirement of any expelling gas is, of course, that the same be entirely inert so as to inhibit decomposition of the carbohydrates in the beverage and while this requirement is satisfied by the commonly used carbon dioxide gas, the use of such gas makes impossible the uniformity and control of the the degree of carbonation in the beverage dispensed as will presently appear. It should be understood that the normal practice followed in dispensing premixed beverages from the closed containers 27 will result in considerable variation in temperature and assuming that it is desired to maintain a degree of carbonation represented by the absorption of 3.5 volumes of gas to each volume of liquid it can be shown that at 40° F. a pressure of 21.5 pounds per square inch will be required. If, however, in shipping the temperature rises to 70° the pressure required or generated will be 46 pounds per square inch. If such back pressure of $CO_2$ gas is placed in the container the beverage therein will become highly over-carbonated when the temperature is reduced down to 40° since a much larger volume of $CO_2$ gas will be gradually absorbed by the liquid. This difficulty is avoided by the use of nitrogen gas which being much lighter than the $CO_2$ gas will not be absorbed in the liquid but rather will remain entirely above the surface thereof.

The use of nitrogen gas as the expellent is even more advantageous when employed in multiple drink installations as shown in Figure 6 where the containers 27a, 27b, and 27c are individually connected to dispensing faucets 68 through conduits 71 and cooling coils 72, the latter being housed in cooling tank 70. First, the ability to use an expellent gas pressure sufficiently high to inhibit decarbonation of any one of the three beverages regardless of its temperature while making impossible overcarbonation upon subsequent cooling is a very desirable result. In the present systems where $CO_2$ gas is used the pressure applied must be kept quite low to avoid overcarbonation and upon a fresh warm container being tapped into the system the excess pressure therein will not only bleed into the other containers but in many instances will force the beverage contained therein back out through the gas inlet connection, thus contaminating the other beverages.

Our invention also enables different beverages, requiring different degrees of carbonation, to be properly dispensed from the simple apparatus of Figure 6 since in no case is the degree of carbonation of any of the beverages disturbed. Thus container 27a may be filled with orange juice requiring no carbonation, while container 27b may be filled with a citric acid base beverage requiring a low degree of carbonation and the container 27c may be filled with a cola drink requiring a much higher degree of carbonation. The common gas supply line may be used as shown at 74 and it is only necessary to maintain on this line a pressure high enough to contain the original carbonation in any of the beverages dispensed when subjected to any expected temperature variation.

The above specifically described embodiment of the invention should be considered as illustrative only as obviously many changes may be made therein without departing from the spirit or scope of the invention. Reference should therefore be had to the appended claims in determining the scope of the invention.

We claim:

1. In apparatus for filling a closed container having an outlet and an inlet at its upper end with a carbonated beverage the combination of a conduit having quick-detachable interconnection with said inlet and a second conduit having quick-detachable interconnection with said outlet, said second conduit including a normally open valve and an exhaust port, valved conduit means to supply a back-pressuring gas to said first conduit to dispel the air originally contained in said container through said second conduit and said exhaust port, a second valved conduit to supply carbonated liquid to said first conduit to fill said container while the back-pressuring gas contained therein is expelled through said second conduit and exhaust port, and means to close said valve upon said container being filled with liquid.

2. Apparatus according to claim 1 further including a differential pressure responsive valve for said exhaust port, said differential pressure responsive valve being connected for pressure response to the pressure existent in the carbonated liquid supply and to the pressure existent in said second conduit whereby said container is filled under a predetermined pressure differential and against a predetermined back pressure.

3. Apparatus according to claim 2 further including a liquid level responsive device in said outlet and connected to close the normally open valve in said second conduit upon the liquid level in said container rising to said outlet.

4. In apparatus for filling a closed container having an inlet port and an outlet port at its upper end the combination of a first conduit adapted to be connected to said inlet port and a second conduit adapted to be connected to said outlet port, a source of liquid under a predetermined pressure, a source of a back-pressuring gas under predetermined pressure, a first valve establishing communication between said gas source and said first conduit, a second valve establishing communication between said liquid source and said first conduit, a third valve constituting a controlled exhaust port for said second conduit, differential pressure responsive means to close said first valve upon the pressure in said second conduit reaching a predetermined value in relation to the pressure of the gas source, and a second differential pressure responsive means to open said third valve upon the pressure in said second conduit reaching a predetermined value in relation to the pressure of the gas source.

5. In apparatus for filling a closed container having an inlet port and an outlet port at its upper end the combination of the first conduit adapted to be connected to said inlet port and a second conduit adapted to be connected to said outlet port, means to supply in sequence a back-pressuring gas and a filling liquid to said first conduit, a valve constituting a controlled exhaust port for said second conduit, and a differential pressure responsive device to open said valve upon the pressure in said second conduit reaching a predetermined value in relation to the pressure of the liquid furnished said first conduit.

6. Apparatus according to claim 5 further including a gauge to indicate the pressure of the liquid supplied, and a second gauge to indicate the pressure existent in said second conduit intermediate said exhaust port and said outlet port.

7. In apparatus for distributing and dispensing carbonated beverages the combination of a shipping container having a pair of spaced couplings extending upwardly and outwardly of the container and being in communication with the space in the container, a filling tube extending downwardly from one of said couplings and having an open end positioned adjacent the bottom of the container, a valve housed in each of said couplings in normal blocking relation to the passage therethrough and normally biased to outward closed position, a conduit fitting for each of said couplings and having quick detachable interconnection therewith, and each of said fittings having a depending member adapted to engage and move said valves downwardly to open position upon application of said fittings to said couplings, said depending members comprising tubular conduit sections and constituting the passage means for directing fluids into and out of said shipping container.

8. In apparatus for distributing and dispensing carbonated beverages a normally closed shipping container having a hollow coupling extending upwardly and outwardly of the container and being in communication with the space in the container, a tube extending downwardly from said coupling and having an open end positioned adjacent the bottom of the container, a valve housed in said coupling in normal blocking relation to the passage therethrough and normally biased to outward closed position, a conduit fitting having a tubular stem projecting therefrom adapted to be slidably received in the opening in said coupling and to engage and open said valve whereby communication may be established through said tube, coupling, stem and fitting, cooperating means on said coupling and fitting whereby the latter may be quickly connected to and disconnected from said coupling and when connected to said coupling said stem is operative to hold said valve open, and means providing a second port in the top wall of said container, the arrangement being such that during filling of the container through said coupling the gas in said container may be bled off through said second port while during dispensing of the beverage from said container gas pressure may be admitted into said container through said second port to force the liquid contained in said container up through said tube, coupling, stem and fitting.

9. Apparatus according to claim 7 further including an annular recess in the opening through each of said couplings between said valve and the upper end of said coupling, and a yieldable annular sealing ring retained within said recess and adapted to tightly engage the outer surface of said tubular conduit section upon the connecting of said fitting to said coupling as aforesaid.

10. In apparatus for distributing carbonated beverages the combination of a shipping container having a removable cap and a pair of spaced couplings extending upwardly and outwardly of the container and being in communication with the space in the container, a filling tube extending downwardly from one of said couplings and having an open end positioned adjacent the bottom of the container, means to supply carbonated water through one of said couplings to said filling tube under predetermined pressure, conduit means connected with the other of said couplings to maintain a predetermined back pressure in said container during the filling thereof, said conduit means comprising a fitting adapted to have quick-detachable interconnection with said other coupling, said means to supply carbonated water comprising a second fitting having a quick-detachable interconnection with the said one of said couplings, normally closed valves in each of said couplings, and means to open said valves comprising tubular extensions of said fittings, said tubular extensions comprising fluid passages.

11. Apparatus according to claim 10 further characterized in that each of the valves in said couplings comprises a fluid impervious disc, each of said couplings having an outlet and a shoulder concentric therewith against which the valve is seated by pressure existent in said container, and a biasing spring in each of said couplings to yieldably urge the valve contained therein against the shoulder contained therein.

12. In a system for dispensing a pre-mixed carbonated beverage a normally closed shipping container having a vertically disposed dispensing tube therein carried by and depending from an upper wall thereof, the lower end of said tube being positioned adjacent the bottom wall of said container and the upper end of said tube being open to the atmosphere, conduit connecting means at the upper end of said tube to establish conduit connection therewith, said container also having a port in its upper end portion exteriorly of said tube; and means to fill said container with a carbonated liquid comprising a conduit leading to said conduit connecting means, means to supply in sequence to said conduit a back-pressuring gas and said liquid, a valve communicating with said port for bleeding off said gas, and a differential pressure responsive device for operating said valve in response to the pressure differential existent between the liquid being supplied to the container and the gas in the container to thereby effect a predetermined rate of filling of the container.

13. In apparatus for filling a closed container with an oxidizable carbonated beverage the combination of exhaust means connecting said container, said exhaust means including a diaphragm operated differential pressure responsive valve, a source of gas under pressure, means connecting said source of gas with a first side of the diaphragm operator for said valve, means including a purging valve connecting said source with the lower portion of said container, means connecting the interior of said container with the second side of said diaphragm operator whereby upon said purge valve being opened gas enters the lower portion of said container to expell the atmosphere therein through said exhaust means against a predetermined back pressure differential, a source of carbonated water, means including a charging valve connecting said source of carbonated water with said container, and means connecting said source of gas with said source of carbonated water whereby when said charging valve is open water is forced into said container under the pressure of said gas, while the gas in said container is expelled therefrom under a predetermined back pressure differential.

14. The method of mixing and charging carbonated beverages and preparing the same for distribution and dispensing which comprises placing flavoring syrup in a closed shipping container, purging the air in said container by injecting carbon dioxide gas into the lower portion of the container while simultaneously bleeding air from the upper and lower portion of the container, injecting carbonated water into the lower portion of said container whereby to cause said water to move upwardly through said syrup to thereby thoroughly mix with and charge the same, simultaneously with said last step bleeding off said carbon dioxide gas from the upper portion of said container while maintaining said carbon dioxide gas under a predetermined pressure relative to the pressure of said carbonated water, and sealing said container under pressure.

References Cited in the file of this patent

UNITED STATES PATENTS

| | | |
|---|---|---|
| 2,012,247 | Muller | Aug. 20, 1935 |
| 2,057,800 | Strelow | Oct. 20, 1936 |
| 2,122,949 | Piquerez | July 5, 1938 |
| 2,165,684 | Struck | July 11, 1939 |
| 2,297,190 | McKinnis | Sept. 29, 1942 |
| 2,400,955 | Samel | May 28, 1946 |
| 2,588,677 | Welty et al. | Mar. 11, 1952 |
| 2,609,984 | Barnes | Sept. 9, 1952 |

FOREIGN PATENTS

| | | |
|---|---|---|
| 9,323 | Great Britain | Apr. 22, 1907 |